(12) United States Patent
Kapinos et al.

(10) Patent No.: US 10,349,714 B2
(45) Date of Patent: Jul. 16, 2019

(54) HANDHELD ELECTRONIC DEVICE WITH GRIPPING ELEMENTS

(71) Applicant: Lenovo (Singapore) Pte. Ltd., New Tech Park (SG)

(72) Inventors: Robert James Kapinos, Durham, NC (US); Russell Speight VanBlon, Raleigh, NC (US); Scott Wentao Li, Cary, NC (US); Timothy Winthrop Kingsbury, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 73 days.

(21) Appl. No.: 15/277,152

(22) Filed: Sep. 27, 2016

(65) Prior Publication Data

US 2018/0084880 A1   Mar. 29, 2018

(51) Int. Cl.
*A45C 11/00* (2006.01)
*A45F 5/00* (2006.01)
*G06F 1/16* (2006.01)

(52) U.S. Cl.
CPC .............. *A45C 11/00* (2013.01); *A45F 5/00* (2013.01); *G06F 1/1626* (2013.01); *G06F 1/1656* (2013.01); *A45C 2011/002* (2013.01); *A45C 2011/003* (2013.01); *G06F 2200/1633* (2013.01)

(58) Field of Classification Search
CPC .............. A45C 11/00; A45C 2011/003; A45C 2011/002; G06F 1/1656; A45F 5/00
USPC ............ 361/679.3, 679.09; 455/575.8, 575.6
See application file for complete search history.

(56) References Cited

U.S. PATENT DOCUMENTS

| | | | | |
|---|---|---|---|---|
| 4,953,113 A * | 8/1990 | Chadima, Jr. | ........ | G06F 15/0216 235/1 D |
| 6,101,086 A * | 8/2000 | Kim | ..................... | G06F 1/1656 108/43 |
| 6,532,152 B1 * | 3/2003 | White | ............... | G02F 1/133308 312/223.1 |
| 6,844,845 B1 * | 1/2005 | Whiteside | .............. | H05K 5/061 342/357.64 |
| 7,775,438 B2 * | 8/2010 | Beckhusen | ........... | G06F 1/1626 235/462.43 |
| 8,428,664 B1 * | 4/2013 | Wyers | ..................... | F16M 13/04 455/575.1 |
| 9,182,785 B2 * | 11/2015 | Wyner | ..................... | A45C 11/00 |
| 2001/0024945 A1 * | 9/2001 | Inomata | .............. | H04M 1/0254 455/575.1 |
| 2012/0199501 A1 * | 8/2012 | Le Gette | ................ | F16M 11/04 206/45.24 |
| 2016/0058143 A1 * | 3/2016 | Tien | ........................ | A45C 11/00 224/191 |
| 2016/0182114 A1 * | 6/2016 | Tien | ...................... | H04B 1/3888 224/191 |

* cited by examiner

*Primary Examiner* — Jinhee J Lee
*Assistant Examiner* — Rockshana D Chowdhury
(74) *Attorney, Agent, or Firm* — Dean D. Small; The Small Patent Law Group, LLC (57) ABSTRACT

Methods and devices are provided for a handheld electronic device. The device comprises a processor, memory storing program instructions accessible by the processor to operate the electronic device, and a housing including a back surface and a peripheral edge. The housing includes one or more grooves. A gripping element is provided within the groove. The gripping element includes a textured surface that is recessed within the groove.

20 Claims, 7 Drawing Sheets

HANDHELD ELECTRONIC DEVICE WITH GRIPPING ELEMENTS

BACKGROUND

Embodiments of the present disclosure generally relate to handheld electronic devices and more particularly to gripping elements that enable a user to more easily hold a handheld device.

A wide variety of handheld electronic devices are offered today. Examples of handheld electronic devices include cellular telephones, tablet devices, electronic games, recording devices, cameras, remote control devices and the like. Users handle electronic devices numerous times throughout the day, while performing various other tasks and when positioned in various postures.

For example, a user may insert and remove a handheld electronic device (e.g., a cellular telephone) from the user's pocket or handbag multiple times over the course of the day, such as when checking notifications, text messages, answering or placing telephone calls, email and the like. The user may do so while standing, sitting, walking, and/or carrying other items in one or both hands. Users often handle electronic devices while occupied with various other activities, such as while riding in an automobile, jogging, attending a classroom, and the like.

Unfortunately, the foregoing usage patterns lead to handheld electronic devices being dropped. In particular, cell phones that have a smooth housing surface are easily dropped. Various attempts have been proposed to reduce the likelihood that a device is dropped. For example, the housing of the device may be formed with rough surfaces. Additionally or alternatively, a separate case may be attached to the device, where the case has a rough surface to facilitate gripping.

However, the rough surfaces provided on device housings and/or exhibit certain limitations. In particular, the rough surface on the housing or case catches on clothing or other objects in a pocket or handbag and in turn render it more difficult to remove the device from the pocket, handbag or other constrained area. As another example, a case may be formed with a sticky or rubber surface that exhibits strong frictional characteristics. Unfortunately, when the handheld device is inserted into a pocket, handbag or other constrained area, the sticky surface also engages the surrounding environment (e.g., pants material, a person pocket, a backpack pocket, etc.) and increases the difficulty to remove the device.

A need remains for improved gripping elements that facilitate gripping by the fingers of an individual, without unduly increasing the difficulty to remove a handheld device from a constrained area.

SUMMARY

In accordance with embodiments herein, a handheld electronic device is provided. The device comprises a processor, memory storing program instructions accessible by the processor to operate the electronic device, and a housing including a back surface and a peripheral edge. The housing includes one or more grooves. A gripping element is provided within the groove. The gripping element includes a textured surface that is recessed within the groove.

Optionally, the textured surface may be a knurled surface, a silicon based surface, thermoplastic polyurethane and the like. Optionally, the housing may hermetically enclose the processor and memory. The housing may form a removable case detachably mounted to the handheld electronic device. The case may have a form factor configured to be held in a user's hand. The back surface and the peripheral edge may collectively define an external envelope of the housing. The gripping element may be set back within the groove by a predetermined offset from the external envelope of the housing. The gripping element may be elongated to extend along a longitudinal axis. The gripping element may be rounded to form an arcuate cross section curved about the longitudinal axis.

Optionally, the device may comprise a plurality of the grooves and a corresponding plurality of the gripping elements provided at separate locations on the housing. The groove and gripping elements may extend along the peripheral edge of the housing. The peripheral edge may include a side portion having the groove and gripping element provided therein. The side portion may include a pair of rails extending along the side portion with the gripping element located there between. The gripping element may be recessed by an offset relative to distal ends of the rails. The groove may be located within the back surface of the housing. The gripping element may be recessed by an offset relative to the back surface.

In accordance with embodiments herein, a housing for a handheld electronic device is provided. The housing comprising front and back surfaces and a peripheral edge. One or more grooves are provided in one or more of the front and back surfaces and peripheral edge. A gripping element is provided within the groove. The gripping element includes a textured surface that is recessed within the groove.

Optionally, the housing may hermetically enclose a processor and memory storing program instructions accessible by the processor to operate the electronic device. The housing may form a removable case having a device retention cavity that detachably receives a handheld electronic device. The recessed groove and gripping element may have a width that is dimensioned to enable an individual's fingers to engage the textured surface, while external flexible materials may span across the recess without engaging the textured surface.

Optionally, the gripping element may be elongated and dimensioned to have a width that is substantially narrower than a length thereof. The external envelope may extend flush along each of the front and back surfaces and flush along the peripheral edge. The textured surface may have a predetermined pattern of depressed areas and raised areas.

In accordance with embodiments herein, a method for providing a housing for a handheld electronic device is provided. The method comprises providing a housing that includes a back surface and a peripheral edge, forming one or more groove in the housing and providing a gripping element recessed within the groove. The gripping element includes a textured surface.

Optionally, the method may further comprise hermetically enclosing, within the housing, a processor and memory storing program instructions accessible by the processor to operate the electronic device. The method may further comprise recessing the gripping element within the groove by an offset relative to an exterior envelope of the housing, and defining the offset such that a user's finger engages the textured surface when gripping the housing. The method may further define a width of the groove such that exterior materials span across the groove without engaging the textured surface when the housing is positioned in a constrained area.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Figure 1:
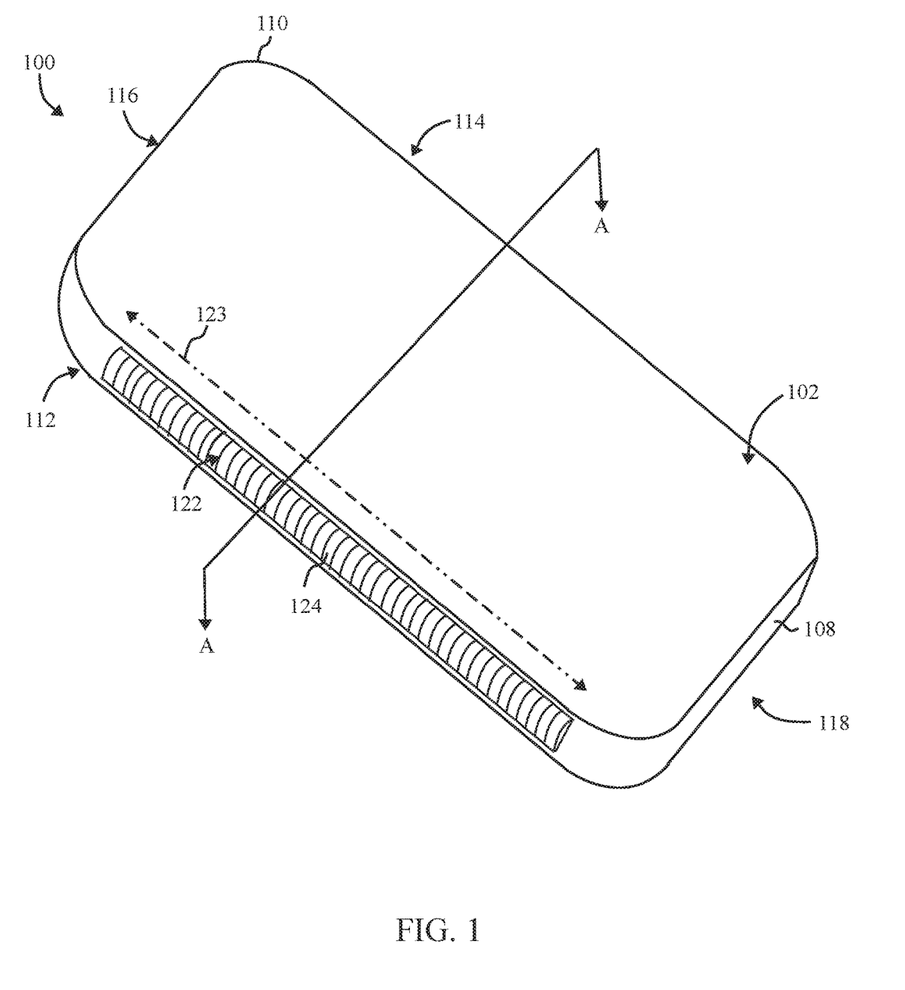
FIG. 1 illustrates a side perspective view of a handheld electronic device formed in accordance with an embodiment herein.
Figure 2:
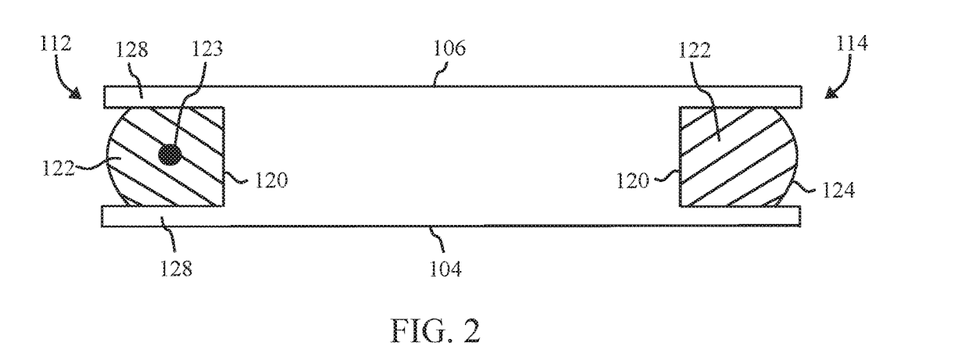
FIG. 2 illustrates a cross-sectional view taken along the section line A-A through the device of FIG. 1 in accordance with embodiments herein.

FIG. 1 illustrates a side perspective view of a handheld electronic device 100 formed in accordance with an embodiment herein. The device 100 includes a housing 102 that is generally rectangular in shape. FIG. 2 illustrates a cross-sectional view taken along the section line A-A through the device 100 of FIG. 1. FIGS. 1 and 2 are described hereafter in combination.

The housing 102 includes front and back surfaces 104 and 106 that are generally planar and oriented generally parallel to one another. A peripheral edge 108 extends about the housing 102. The peripheral edge 108 has a width or thickness corresponding to the distance between the front and back surfaces 104 and 106. In the example of FIGS. 1 and 2, the peripheral edge 108 has rounded corners 110. It is recognized that the rectangular geometry and shape of the housing 102 is merely one example and numerous different shapes that may used.

The peripheral edge 108 may be conceptually segmented into side portions 112 and 114, and end portions 116 and 118. With reference to FIG. 2, the side portions 112 and 114 are formed with grooves 120 therein. The grooves 120 include gripping elements 122. The griping elements 122 may be formed separate from or integral with the grooves 120. The gripping elements 122 include textured surfaces 124 that are described hereafter in more detail. The gripping elements 122 and grooves 120 are elongated and dimensioned to have a width that is substantially narrower than a length thereof. As explained herein, the grooves 120 and gripping elements 122 have a width that is dimensioned to enable a user's finger to engage the textured surface 124, while other external material will span across the recess without engaging the textured surface 124. In the example of FIG. 1, only the groove 120 and gripping element 122 in the side portion 112 is visible. A corresponding groove and gripping element are provided in the side portion 114 (as illustrated in FIG. 2). The grooves 120 are elongated to extend along the side portions 112 and 114. The gripping element 122 and groove 120 within side portion 112 extend along a longitudinal axis 123.

Figure 3:
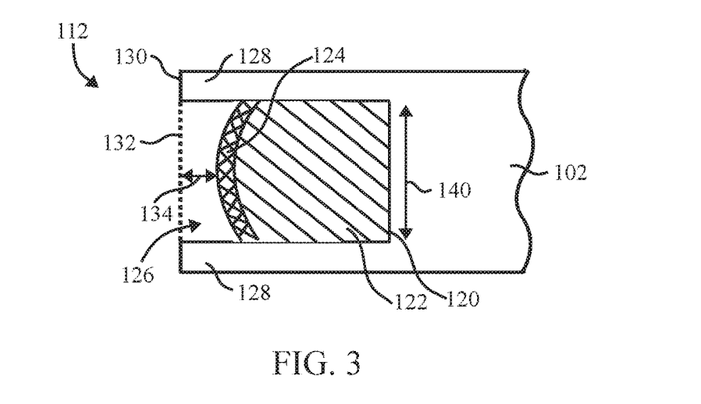
FIG. 3 illustrates an enlarged side sectional view of the side portion of the housing in accordance with embodiments herein.

With reference to FIG. 2, the longitudinal axis 123 is illustrated as a point as the longitudinal axis 123 extends into and out of the page. The gripping element 122 is rounded to form an arcuate cross section that is curved about the longitudinal axis 123. Peripheral edges of the gripping element 122 contact rails 128 on opposite sides of the groove 120, while a central portion of the gripping element 122 extends further outward within the groove 120 to a position closer to (but still recessed within) an exterior envelope 132 (FIG. 3).

The grooves 120 have a width 140 (FIG. 3) that is slightly less than the spacing between the front and back surfaces 104 and 106. The grooves open outward onto the side portions 112 and 114. The grooves have a depth that is predetermined, as explained herein, based on the dimensions of the gripping element 122 inserted therein.

The gripping elements 122 are provided along the side portions 112 and 114 in part because the side portions 112 and 114 represent one of the primary gripping surfaces on rectangularly shaped handheld electronic devices (e.g., cellular phones). An individual's fingers gently grip the side edges of the cellular phone. The individual's fingers are generally more flexible than cloth or other material, such as in pockets, handbags and other constrained areas. The added flexibility of an individual's fingers allows the fingers to firmly engage the textured surface 124 of the gripping elements 122.

In the embodiment of FIG. 1, the gripping elements 122 extend along a substantial majority of the side portions 112 and 114. Optionally, the gripping elements 122 may be provided only along one of the side portions 112 or 114. Additionally or alternatively, the gripping elements 122 may be shorter in length. For example, the gripping elements 122 may only extend along a segment of the side portions 112 and 114. As another option, the gripping elements 122 may be divided into multiple segments and positioned at separate and distinct regions along the side portions 112 and 114. Additionally or alternatively, the gripping elements 122 may be provided along one or both of the end portions 116 and 118. Optionally, gripping elements 122 may be provided in a variety of additional or alternative locations and configurations.

FIG. 3 illustrates an enlarged side sectional view of the side portion 112 of the housing 102. The gripping element 122 is securely maintained within the groove 120 and oriented with the textured surface 124 facing toward an opening 126 in the groove 120. The gripping element 122 is bordered on opposite sides by a pair of rails 128 that have distal ends 130 defining an external envelope 132 extending there between. The rails 128 are located along opposite sides of the groove 120 and are separated by a width 140 of the groove 120. The external envelope 132 is represented in a dashed line and extends between the distal ends 130. The exterior envelope 132 extends flush along each of the front and back surfaces 104 and 106, and flush along the peripheral edge 108.

The textured surface 124 is spaced below or within the external envelope 132 by a predetermined offset 134. The offset 134 may be varied based on several criteria, such as the width of the groove 120, the nature of the textured surface 124, and the thickness of the housing 102 (e.g., as measured between the front and back surfaces 104 and 106). The offset 134 may also be varied based upon an intended user. For example, when the electronic device 100 is designed for an individual with small hands, the individual's small fingers will have sufficient dexterity to fit into a narrow groove 120. Alternatively, when the electronic device 100 is designed for use by an individual with large hands (or an older individual with less dexterity), the individual's fingers will not as easily fit into a narrow groove 120. Consequently, the width 140 of the groove 120 and/or the offset 134 may be adjusted to accommodate the various intended users.

Figure 4A:
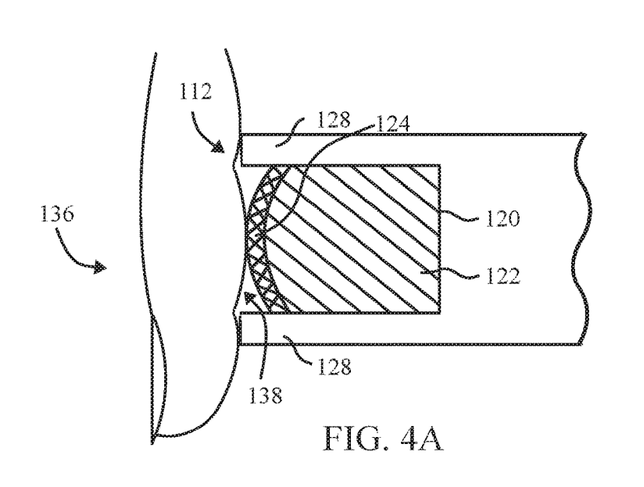
FIG. 4A illustrates a side sectional view of the side portion while in use in accordance with embodiments herein.

FIG. 4A illustrates a side sectional view of the side portion 112 while in use. The gripping element 122 is set back within the groove 120 by the predetermined offset 134 (FIG. 3) from the external envelope of the housing 102. As illustrated in FIG. 4, a finger 136 is held over the side portion 112. The finger 136 spans across the opening 126 (FIG. 3), but when pressed against the side portion 112, a distal portion 138 of the finger 136 extends into the groove 120 and firmly engages the textured surface 124 on the gripping element 122. The embodiment of FIG. 4A utilizes the flexibility of flesh to enter the opening 126. The offset 134 is defined such that a portion of the user's finger will engage the textured surface 124 when gripping the housing 102. While the example of FIG. 4A illustrates the finger 136 to have the distal portion 138 extending within the groove 120, optionally, the finger 136 may span both of the rails 128. When the user squeezes inward, the finger 136 (or a thumb or a portion of the palm) would still engage the textured surface 124.

As a further example, it is recognized that while FIG. 4A illustrates only a single finger 136, multiple fingers (and/or thumb) on a user's hand may wrap around the side portions 112 and 114. One or more of the fingers may be positioned with the distal portion 138 extending into the groove 120 as shown in FIG. 4, while one or more other fingers may be positioned to span across both rails 128. Numerous gripping configurations may be used.

Figure 4B:
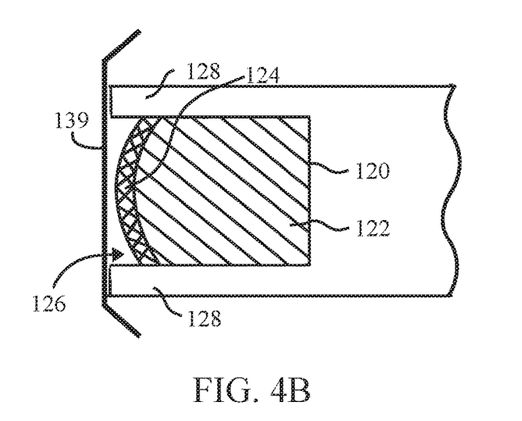
FIG. 4B illustrates the side sectional view of the side portion while stored in a constrained space proximate to a material in accordance with embodiments herein

FIG. 4B illustrates the side sectional view of the side portion 112 while stored in a constrained space proximate to a material 139 (e.g., in a pocket, handbag, etc.). FIG. 4B illustrates how fabric or other taut sheet material is not affected by the grooves or knurls. The width 140 (FIG. 3) of the groove 120 is defined such that common exterior materials 139 (e.g., cloth within a pocket, handbag or other constrained area) span across the groove 120 without engaging the textured surface 124 when the housing 102 is positioned in a constrained area.

Figure 5:
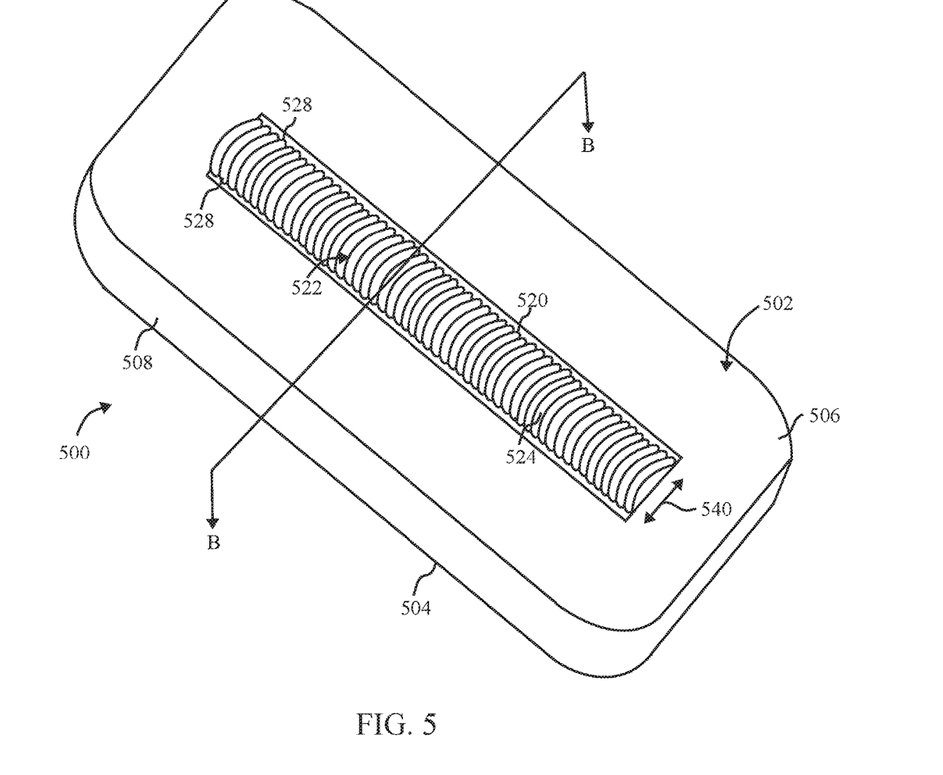
FIG. 5 illustrates a device formed in accordance with an alternative embodiment.
Figure 6:
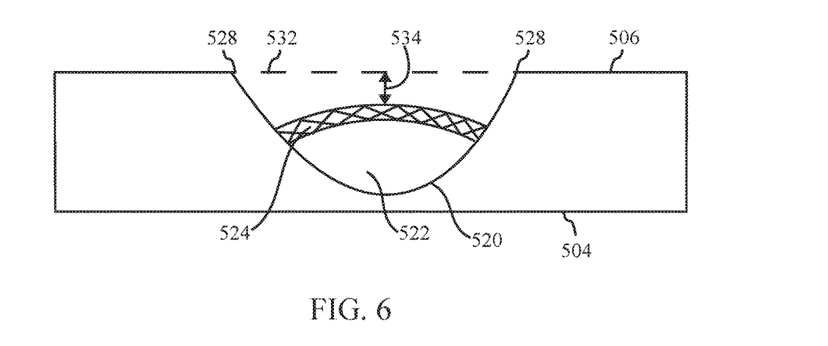
FIG. 6 illustrates a cross-sectional view taken along the section line B-B through the device of FIG. 5 in accordance with embodiments herein.

FIG. 5 illustrates a device 500 formed in accordance with an alternative embodiment. The device includes a housing 502 that is generally rectangular in shape. FIG. 6 illustrates a cross-sectional view taken along the section line B-B through the device 500 of FIG. 5. FIGS. 5 and 6 are described hereafter in combination.

The housing 502 includes front and back surfaces 504 and 506 that are generally planar and oriented generally parallel to one another. A peripheral edge 508 extends about the housing 502. The back surface 506 is formed with a groove 520 therein. The groove 520 receives a gripping element 522 that is elongated to extend along a length of the back surface 506.

The gripping element 522 includes a knurled surface 524. The gripping element 522 may be provided in place of, or in addition to, the gripping elements 122 described above in connection with FIGS. 1-4. The gripping element 522 extends along a substantial majority of the back surface 506. Optionally, the gripping element 522 may be provided along smaller discrete sections within the back surface 504.

The groove 520 has a predetermined width 540 that is bounded on opposite sides by edges 528. The edges 528 may be flush with the back surface 506, or alternatively, raised slightly above the back surface 506. The groove 520 opens outward onto the back surface 506 and has a depth that is predetermined based on the dimensions of the gripping element 522. The edges 528 defined an external envelope 532 that extends flush along a plane of the back surface 504. The external envelope 532 is represented by a dashed line and extends between the edges 528. The knurled surface 524 is spaced below the external envelope 532 by a predetermined offset 534. The offset 534 and width 540 may be varied based on various criteria as described above.

In accordance with the embodiments described herein, a housing may be provided as an integral part of a handheld electronic device. The housing hermetically encloses the various electronics and mechanical structures, such as but not limited to one or more processors, memory, a display, a user interface, communications interfaces, communications ports, a battery power supply, an interface to an AC power supply, wireless communications chipsets and the like. As non-limiting examples, the handheld electronic device may represent cellular telephones (smart phone or otherwise), tablet devices, electronic games, remote control for a gaming system, recording devices, cameras, laptop computer, GPS device, remote control devices and any other handheld electronic device. As additional examples, the handheld electronic device may represent a personal-care item, such as a reading pen, massage device, electric shaver, and the like.

Optionally, embodiments herein may be provided with housings that are formed separate from, but configured to be attached to, handheld electronic devices. For example, the housing may be constructed to form a removable case that is configured to be detachably mounted to a handheld electronic device. The case is shaped and dimensioned to have a form factor that is configured to be held in a user's hand where one or more fingers wrap around one or both peripheral edges of the case.

Figure 7:
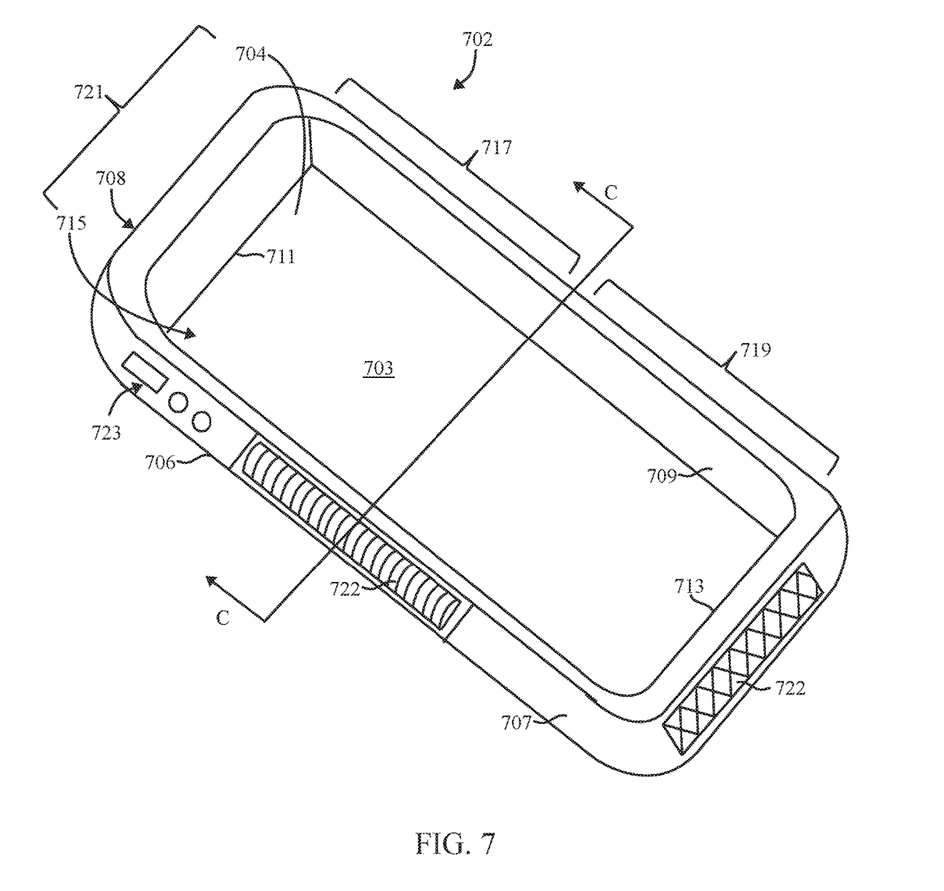
FIG. 7 illustrates a case housing that is constructed to form a removable case for a handheld electronic device in accordance with embodiments herein.

FIG. 7 illustrates a case housing 702 that is constructed to form a removable case for a handheld electronic device, such as a cellular telephone, a tablet device, a laptop computer and the like. The housing 702 includes a bottom wall 703 that includes a front surface 704 and a back surface 706 that are generally planar and oriented generally parallel to one another and separated by the thickness of the back wall 703. The housing 702 includes side walls 707, 709 and end walls 711, 713 that are integrally formed with one another and with the back wall 703. The side and end walls 707, 709, 711, 713 collectively define a peripheral edge 708 that extends about the housing 702. While the example of FIG. 7 illustrates rounded corners on the peripheral edge 708, it is understood that alternative shapes may be utilized.

The peripheral edge 708 extends upward from the back wall 703 to define a device retention cavity 715 that is configured to detachably receive a handheld electronic device. In the example of FIG. 7, the cavity 715 is generally rectangular, to conform to the shape of a cellular phone, tablet device and the like. Optionally, the cavity 715 may be dimensioned and shaped differently when designed to receive alternative electronic devices, such as gaming devices, remote controls for games, recording devices, cameras, laptop computer, GPS device, personal-care items and the like.

The sidewall 707 and the end wall 713 are illustrated to include gripping elements 722. The gripping element 722 is provided along a portion of the sidewall 707 and is located adjacent to user controls 723 (e.g., volume UP/DOWN, switch). The gripping element 722 provided along the sidewall 707 is shorter, as compared to a length of the gripping elements illustrated in FIGS. 1 and 5. Additionally or alternatively, gripping elements may be provided at one or more desired locations along the end wall 711 and sidewall 709, such as in the segments designated at 717, 719 and 721.

Figure 8:
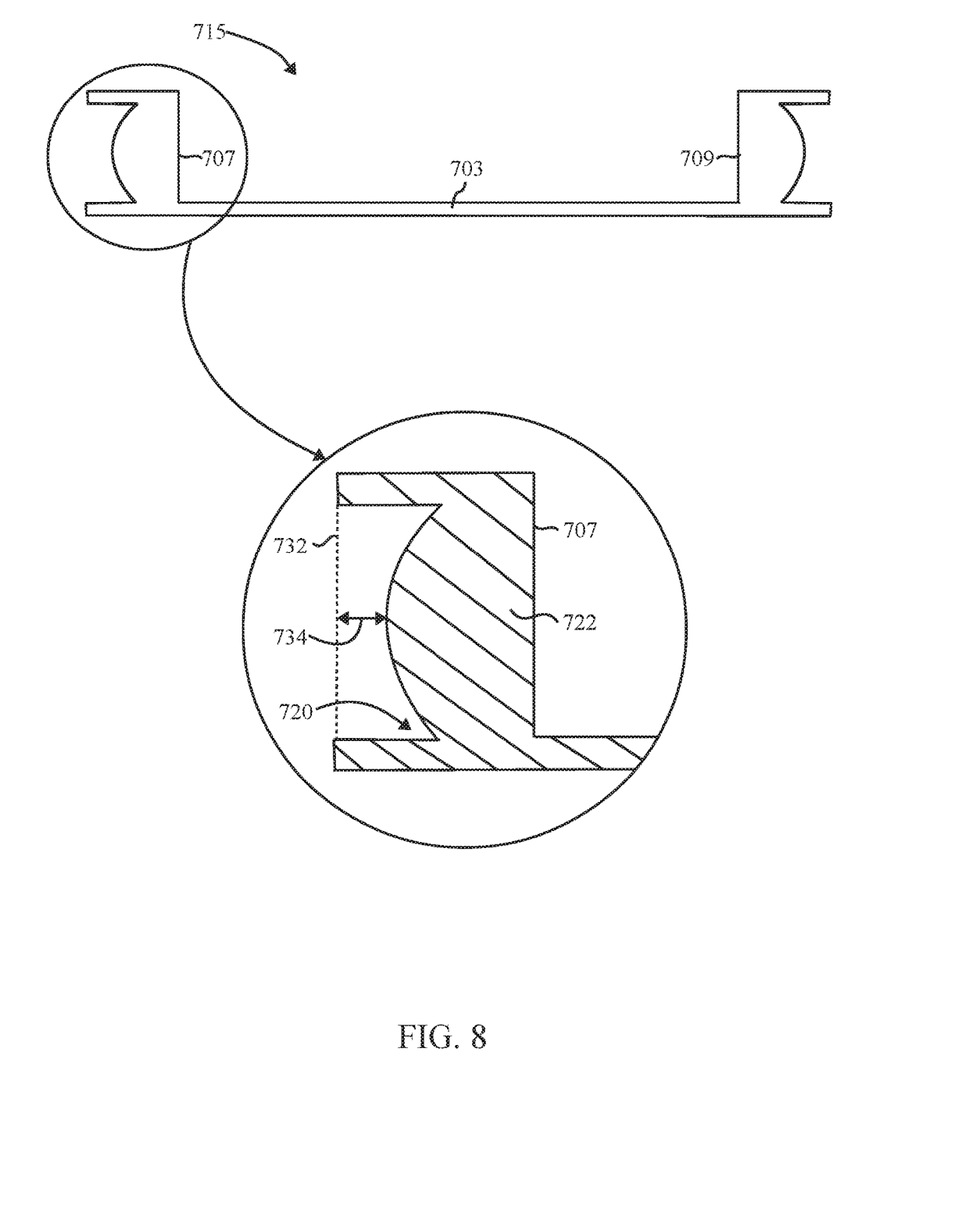
FIG. 8 illustrates a side sectional view taken along line C-C in FIG. 7 in accordance with embodiments herein.

FIG. 8 illustrates a side sectional view taken along line C-C in FIG. 7. FIG. 8 illustrates the bottom wall 703 and sidewalls 707 and 709, with an enlarged detail CC of the sidewall 707. The sidewall 707 includes a groove 720 and a gripping element 722 formed integral with one another (e.g., through molding, casting or otherwise). The gripping element 722 has a knurled surface, with an outermost portion of the gripping element 722 setback by an offset 734 from an exterior envelope 732. The sidewall 707 separates the gripping element 722 from the device retention cavity 715.

Figure 9:
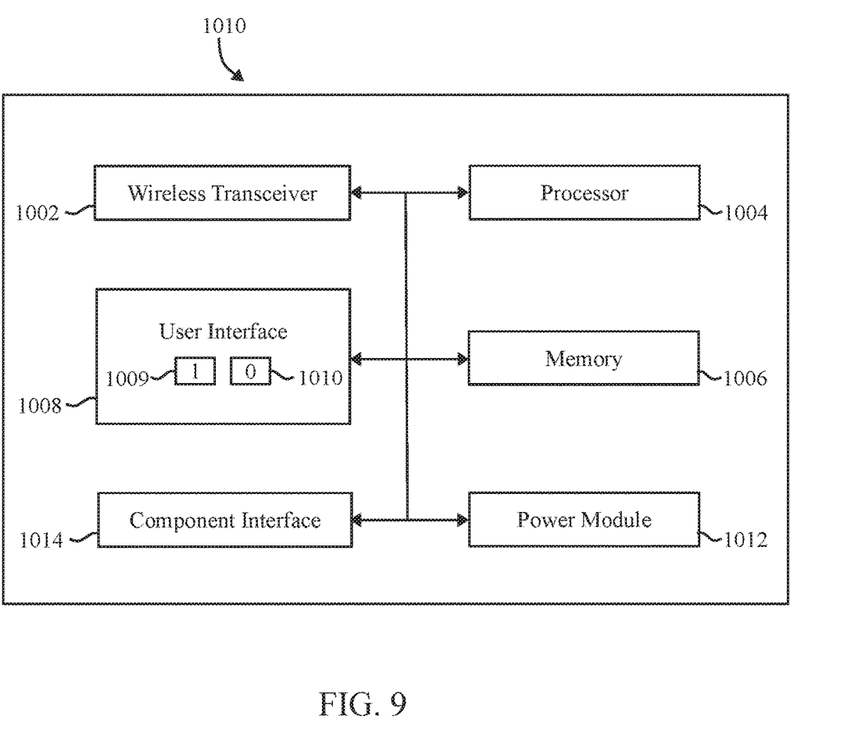
FIG. 9 illustrates a simplified block diagram of a device with a housing in accordance with embodiments herein.

FIG. 9 illustrates a simplified block diagram of a device 1000 with a housing as described herein. The device 100 includes components such as one or more wireless transceivers 1002, one or more processors 1004 (e.g., a microprocessor, microcomputer, application-specific integrated circuit, etc.), one or more local storage medium (also referred to as a memory) 1006, a user interface 1008 generated via the processors 1004. The user interface 1008 includes one or more input devices 1009 and one or more output devices 1010, a power module 1012, and a component interface 1014. All of these components can be operatively coupled to one another, and can be in communication with one another, by way of one or more internal communication links, such as an internal bus.

The input and output devices 1009, 1010 may each include a variety of visual, audio, and/or mechanical devices. For example, the input devices 1009 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 1010 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 1010 may include a touch sensitive screen, a non-touch sensitive screen, a text-only display, a smart phone display, an audio output (e.g., a speaker or headphone jack), and/or any combination thereof.

The user interface 1008 permits the user to select one or more of a switch, button, touch area, or icon in connection with various operations of the device 1000. The local storage medium (memory) 1006 can encompass one or more memory devices of any of a variety of forms (e.g., read only memory, random access memory, static random access memory, dynamic random access memory, etc.) and can be used by the processor 1004 to store and retrieve data. The data that is stored by the memory 1006 can include, but is not limited to, operating systems, applications, contacts, contact lists, contact accounts, communications content and other information. Each operating system includes executable code that controls basic functions of the communication device, such as interaction among the various components, communication with external devices via the wireless transceivers 1002 and/or the component interface 1014, and storage and retrieval of applications and data to and from the memory 1006. Each application includes executable code that utilizes an operating system to provide more specific functionality for the communication devices, such as file system service and handling of protected and unprotected data stored in the memory 1006. Other applications stored in the memory 1006 include various application program interfaces (APIs), some of which provide links to/from the cloud hosting service 102. The power module 1012 preferably includes a power supply, such as a battery, for providing power to the other components while enabling the device 1000 to be portable, as well as circuitry providing for the battery to be recharged. The component interface 1014 provides a direct connection to other devices, auxiliary components, or accessories for additional or enhanced functionality, and in particular, can include a USB port for linking to a user device with a USB cable.

Each transceiver 1002 can utilize a known wireless technology for communication. Exemplary operation of the wireless transceivers 1002 in conjunction with other components of the device 1000 may take a variety of forms and may include, for example, operation in which, upon reception of wireless signals, the components of device 1000 detect communication signals and the transceiver 1002 demodulates the communication signals to recover incoming information, such as voice and/or data, transmitted by the wireless signals.

In the foregoing examples, the gripping elements and corresponding grooves are generally rectangular in shape and oriented to extend along a corresponding longitudinal axis. Optionally, the gripping elements, and the corresponding grooves, may be formed with other shapes, such as square, circular, triangular, oval and the like.

In the foregoing examples, the textured surface is formed as a knurled surface having a predetermined pattern of depressed areas and raised areas. The knurling surface may be formed in various manners and include various patterns. In general, knurling is a manufacturing process, typically conducted on a lathe, whereby a pattern of straight, angled or crossed lines is cut or rolled into the material. The operation is performed for producing indentations on a part of a workpiece. The knurled surface allows hands or fingers to get a better grip on the knurled object than would be provided by the originally smooth surface. By way of example, the knurled pattern may be a series of straight ridges, a helix of "straight" ridges, a criss-cross pattern and the like. Optionally, the textured surface may be formed from a silicon material that has desired frictional characteristics. Optionally, the textured surface may be formed from a thermoplastic polyurethane or a similar material.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A handheld electronic device, comprising:
  a processor;
  memory storing program instructions accessible by the processor to operate the electronic device;
  a housing including a back surface and a peripheral edge, the housing including one or more grooves;
  a gripping element provided within the one or more grooves, the gripping element including a textured surface that is oriented to face outward from the one or more grooves and is recessed within the one or more grooves, wherein the gripping element is elongated to extend along a longitudinal axis and the textured surface is rounded about the longitudinal axis.

2. The device of claim 1, wherein the housing hermetically encloses the processor and memory.

3. The device of claim 1, wherein the housing forms a removable case detachably mounted to the handheld electronic device, the case having a form factor to be held in a user's hand.

4. The device of claim 1, wherein the back surface and the peripheral edge collectively define an external envelope of the housing and wherein the textured surface is set back within the one or more grooves by a predetermined offset from the external envelope of the housing.

5. The device of claim 1, wherein the textured surface is rounded to form an arcuate cross section curved about the longitudinal axis.

6. The device of claim 1, further comprising a plurality of the grooves and a corresponding plurality of the gripping elements provided at separate locations on the housing.

7. The device of claim 1, wherein the one or more grooves and gripping element extend along the peripheral edge of the housing.

8. The device of claim 1, wherein the peripheral edge includes a side portion including a pair of rails extending along the side portion with the gripping element located there between, textured surface facing outward from the pair of rails and recessed by an offset relative to distal ends of the rails.

9. The device of claim 1, wherein the one or more grooves is located within the back surface of the housing, the gripping element recessed by an offset relative to the back surface.

10. A housing for a handheld electronic device, comprising: a front surface, a back surface and a peripheral edge; one or more grooves provided in one or more of the front surface, the back surface and the peripheral edge;
  a gripping element provided within the one or more grooves, the gripping element including a textured surface that is oriented to face outward from the one or more grooves and is recessed within the one or more grooves, wherein the gripping element is elongated to extend along a longitudinal axis and the textured surface is rounded about the longitudinal axis.

11. The housing of claim 10, wherein the housing hermetically encloses a processor and memory storing program instructions accessible by the processor to operate the electronic device.

12. The housing of claim 10, wherein the housing forms a removable case having a device retention cavity to detachably receive the handheld electronic device.

13. The housing of claim 10, wherein the one or more grooves and gripping element have a width that is dimensioned to enable an individual's fingers to engage the textured surface, while external flexible materials span across the one or more grooves without engaging the textured surface.

14. The housing of claim 10, wherein the gripping element is dimensioned to have a width that is substantially narrower than a length thereof.

15. The housing of claim 10, wherein an external envelope extends flush along each of the front and back surfaces and flush along the peripheral edge.

16. The housing of claim 10, wherein the textured surface represents a knurled surface that has a predetermined pattern of depressed areas and raised areas.

17. A method for providing a housing for a handheld electronic device, the method comprising:
providing the housing that includes a back surface and a peripheral edge; forming one or more grooves in the housing;
providing a gripping element recessed within the one or more grooves;
wherein the gripping element including a textured surface that is oriented to face outward from the one or more grooves and is recessed within the one or more grooves, wherein the gripping element is elongated to extend along a longitudinal axis and the textured surface is rounded about the longitudinal axis.

18. The method of claim 17, further comprising hermetically enclosing, within the housing, a processor and memory storing program instructions accessible by the processor to operate the electronic device.

19. The method of claim 17, further comprising recessing the gripping element within the one or more grooves by an offset relative to an exterior envelope of the housing, and defining the offset such that a user's finger engages the textured surface when gripping the housing.

20. The method of claim 19, further comprising defining a width of the one or more grooves such that exterior materials span across the one or more grooves without engaging the textured surface when the housing is positioned in a constrained area.

* * * * *